Aug. 7, 1956  F. H. REICHEL  2,757,495
PROCESS FOR THE PRODUCTION OF STUFFED PRODUCTS
Filed Sept. 6, 1950
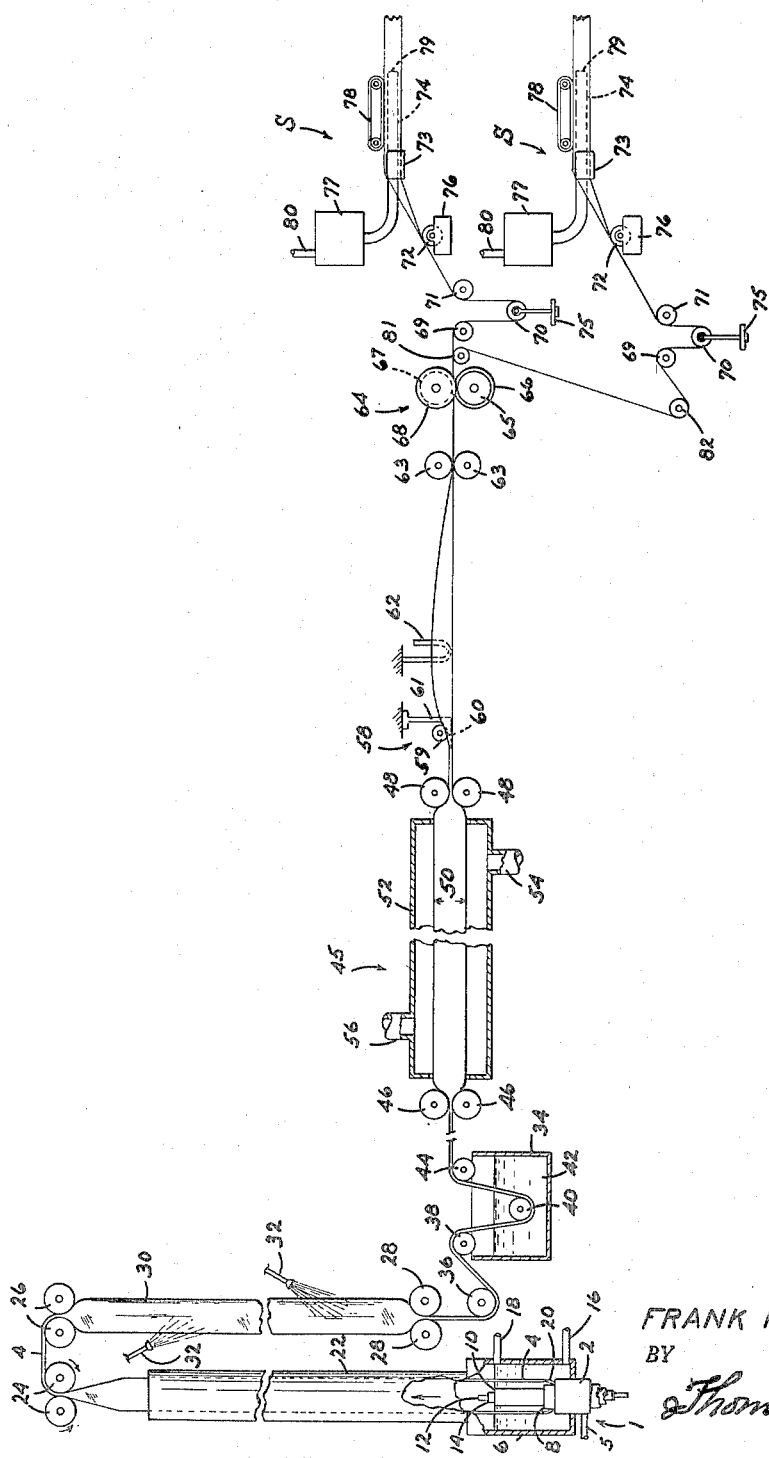
INVENTOR.
FRANK H. REICHEL
BY
Thomas F. O'Nally
ATTORNEY 2,757,495
Patented Aug. 7, 1956

United States Patent Office

2,757,495

PROCESS FOR THE PRODUCTION OF STUFFED PRODUCTS

Frank H. Reichel, Villanova, Pa., assignor to American Viscose Corporation, Wilmington, Del., a corporation of Delaware Application September 6, 1950, Serial No. 183,413

2 Claims. (Cl. 53—20)

This invention relates to an improved process for the production of stuffed products, such as sausage, and is particularly concerned with a type of process which involves the continuous stuffing of a tubular casing which is concurrently and continuously formed from a flat sheet immediately in advance of the stuffing operation by the overlapping and sealing together of the edges of the sheet about the stuffing horn or nozzle as the sheet is passed to the stuffing position.

It has been found that this type of stuffing operation is greatly improved when the sheet material used for making the casing has been stretched not only longitudinally but also transversely. Several outstanding advantages result from the transverse stretch. In the first place, lower stuffing pressures may be used so that there is less danger of the rupture of the seam or joint between the overlapped edges of the tube during stuffing. Secondly, in the preferred practice, the transverse stretching is sufficient to pre-test the casing so that the body of the sheet will not rupture during stuffing. In addition, when transversely stretched sheet material is used in this type of stuffing operation, it is more easily controlled automatically. The products resulting are uniform in character and maintain their shape after stuffing even when suspended from one end.

The process of the present invention generally comprises the production by extrusion of a continuous seamless tube of the material which it is desired to use in the making of the final casing. This tube, during its initial production or at some time subsequent thereto, is stretched transversely and preferably longitudinally as well, the transverse stretching being effected by exerting internal pressure within the tube by means of a fluid which may be either liquid or a gas. The stretched tube is dried in the expanded state and is slit longitudinally to form a sheet which is then fed to the stuffing horn upon which its edges are overlapped and sealed into the form of a tube which passes along the stuffing horn and receives the stuffing discharged therefrom. In the preferred system, the original tube produced is of such a diameter that it may be slit longitudinally into a plurality of aliquot widths, each of which is of the proper dimension to form a casing of the desired diameter. In this preferred system, a single tube-forming operation serves to supply several stuffing machines.

The process of the present invention is illustrated in the accompanying drawing, the single figure of which is an elevation of the system which is shown diagrammatically at portions thereof.

The materials of which the casings of the present invention are formed include the film-forming, non-fibrous materials, such as hydrophilic colloids such as cellulose hydrate, alkali-soluble cellulose ethers of which the water-insoluble, alkali-soluble hydroxyethyl cellulose is especially suitable, gelatine, casein and the like; also synthetic resins, cellulose ethers, cellulose esters, cellulose ether-esters, cellulose mixed esters and the like and mixtures of these substances. The cellulose hydrate can be produced by regeneration from viscose by the deesterification of cellulose esters or by coagulation of cellulose from its solutions in organic and inorganic solvents such, for example, as tetra-alkyl ammonium hydroxides, zinc chloride, alkali metal perchlorates, sulfuric acid and the like. Because of its superior strength, there is preferably employed tubing comprising cellulose hydrate obtained by the denitration of nitrocellulose.

These materials are formed into tubes which are transversely and preferably longitudinally stretched such as by the processes disclosed in Reichel et al. Patent No. 2,176,925 and/or Reichel Patent No. 2,401,798. As shown in the accompanying drawing, a preferred form of apparatus comprises an extrusion head 1 which is of a well-known type and for this reason has not been illustrated in detail. The extrusion head comprises a body 2 provided with a suitable orifice from which plastic film-forming material supplied from any suitable source through the pipe 5 is extruded in the form of a tubing 4. As the tubing issues from the nozzle, it passes up through a bath 6 which comprises a coagulant for the tubing material which hardens the material sufficiently to enable it to retain its tubular shape during subsequent handling. The same coagulating liquid as that contained in the bath 6 is supplied to the interior of the tubing by a pipe 8 and is withdrawn by means of the pipe 10. Air under a low pressure is supplied to the interior of the tubing by means of pipe 12 and is withdrawn by means of pipe 14. The function of the air is to keep the tubing distended so that its shape will be preserved but substantially without stretching it.

The liquid of the bath 6 not only serves as a coagulant for the tubing, but is of such a nature as to condition the tubing for stretching. The liquid of bath 6 is preferably slowly circulated by means of pipes 16 and 18 which lead to and from, respectively, a suitable type of circulating apparatus which contains any suitable means for replenishing the coagulating bath and for maintaining the circulating liquid substantially at the desired temperature.

When the tubing emerges from the orifice, it is only slightly coagulated and therefore invariably undergoes a slight amount of stretching which causes the tubing to expand as shown at 20. The stretching at this point is part of the shaping and the tubing material is not yet in condition to be stretched in a manner which will predetermine its strength and ultimate stretchability and shrinkage characteristics.

The tubing is led upwardly through a jacket 22 which has been shown as being partly broken away for the purpose of illustration and, when nitrocellulose is used for the tubing, any vapors, such as alcohol and ether vapors, may be recovered from this casing by any well-known form of recovery apparatus.

The substantially completely coagulated tubing is passed upwardly between a pair of positively driven squeeze rollers 24. These rollers are urged together by any suitable means so as to collapse the tubing and hold the walls sufficiently tightly together to prevent the passage of air between the rollers with the tubing. These rollers are driven so as to have a circumferential speed substantially equal to the speed of extrusion of the plastic material from the nozzle tube.

The flattened casing 4 is then passed between a pair of squeeze rollers 26 which are also urged together by any suitable means sufficiently to maintain the casing walls in contact and prevent leakage of air therebetween when a substantial air pressure is placed within the tubing beyond the squeeze rollers 26. Means may be provided for raising or lowering one of the pairs of rollers to thus vary the internal pressure so as to compensate for changes in the quantity of gas entrapped between the pairs of rollers.

From the squeeze rollers 26, the casing is fed between another pair of squeeze rollers 28 which are also urged together under sufficient pressure to maintain the tubing walls collapsed when there is a substantial air pressure in the tubing ahead of the rollers. Prior to the time the tubing is passed between the rollers 28, air pressure from any suitable source is introduced into the end of the tubing until the tubing is expanded to the amount necessary to give the desired flat width of the tubing in collapsed state after it passes the rollers 28. When the tubing has been expanded the desired amount, its end is passed between the rollers 28 and the tubing is maintained in an expanded and stretched condition as shown at 30 between the pairs of squeeze rollers 26 and 28.

The tubing may be stretched longitudinally simultaneously with transverse stretching by positively driving the squeeze rollers 28 at a greater circumferential speed than the pair of squeeze rollers 26. If desired, the tubing may be stretched longitudinally either previously or subsequently to the time that it is stretched transversely. For example, the squeeze rollers 26 may be driven at a greater circumferential speed than the squeeze rollers 24 so that the run of casing between these pairs of rollers is longitudinally stretched at that time.

The expanded casing between the squeeze rollers 26 and 28 may be washed to remove the conditioning liquid by spraying the casing at this point with water or other treating liquid by means of sprays 32.

From the squeeze rollers 28, the tubing may be passed directly to one or more suitable washing bath or baths 34 by being passed over idler rollers 36 and 38. The tubing passes about one or more rollers 40 submerged beneath the liquid 42 in each bath and is then passed out of the bath over the roller 44. The specific liquid or liquids used in bath 42 or in the plurality of such baths will be dependent upon the nature of the cellulosic material of the tubing.

When employing thermoplastic tube-forming materials, it has been found that the stretching operations may be facilitated by the application of heat which renders the material more plastic. The degree of stretch under a constant force will be dependent upon the plasticity of the tubing which, in turn, is dependent upon its temperature. From this, it may be seen that the degree of stretch may be varied as desired merely by controlling the temperature of the tubing in the region where stretching takes place. The use of heat to render the tubing plastic is particularly beneficial in that it permits the use of a lower pressure differential between the inside and outside of the tubing, and the attainment of a more uniform expansion and an expansion to a higher degree. The sprays 32 may deliver a hot liquid, such as water, for this purpose.

After the tubing has been stretched longitudinally and/or transversely to the desired amount, the conditioning agent is preferably partly or completely removed preferably while the tubing is in its elongated and/or expanded condition, after which treatment the stretching tension may be released. Thereafter, the tubing may be washed, plasticized or otherwise finished and, in the case of cellulose nitrate finally converted to cellulose hydrate, which conversion fixes the new tensile, stretch and shrinkage characteristics of the product. Thus, the new micellar structure produced by stretching is fixed and rendered substantially permanent, as by converting the cellulose derivative to cellulose hydrate. In the case of viscose, the tubing may be only coagulated or it may be partly regenerated prior to or during the stretching, the setting in the stretched condition being effected by subsequent completion of the regeneration.

The cellulose derivative may be converted partly or completely to cellulose hydrate in a known manner as by treating the tubing with a suitable reagent to deesterify, reduce or decompose the cellulose derivative and replace the substituent by a hydroxyl radical, having regard for the nature of the cellulose derivative. Such conversion may be accomplished by suitable chemical changes known to those skilled in the art. For example, cellulose xanthate may be decomposed to cellulose hydrate by means of heat or a strong mineral acid. Cellulose esters may be converted to cellulose hydrate by suitable deesterification, such as by saponification with a strong alkali, or, by use of a reducing agent such as an alkali hydrosulphide. In the appended claims, the expression "converting" is used generically to include all reactions by which a cellulose derivative may be changed to regenerated cellulose, cellulose hydrate, or to a derivative of lower degree of substitution or to a different cellulose derivative.

The conversion reaction is preferably carried out while the tubing is in the gel state and while the tubing material is in the condition produced by the stretching operation or operations. It has been found that when the micelles in the cellulose derivative gel are rearranged by stretching of the gel, the conversion of the cellulose derivative serves to fix the micelles in their new arrangement, that is, to fix the condition of the tubing material caused by stretching so that the tubing does not return to its original characteristics. Although it is believed that this is the proper explanation of the results obtained by stretching the tubing between substantially complete coagulation and conversion, it is to be understood that the invention is not dependent upon this theory.

To further fix and set the tubing in condition caused by stretching, the tubing is changed from the wet gel state to a dry gel state, for example, by evaporation of any residual solvent and conditioning agent, or by passing the stretched tubing through a suitable bath containing a liquid which is not a swelling agent and which will extract any residual solvent. Where heat has been employed to condition and/or for stretching the tubing, the stretched structure may be fixed by chilling the tubing, for example, by passing it through a bath of cold water or through a stream of cold air or the like.

The converted tubing may be purified and finished in any desired manner, for example, by subjecting it to suitable baths for washing, bleaching, dyeing, plasticizing, preserving, etc., and the purified and treated tubing may then be dried, such as by passing it to the drying system 45 which is preferably, but not necessarily, of any type shown in U. S. Patent 2,401,798. In the specific embodiment shown, it comprises a pair of positively driven pinch rollers 46—46 which are suitably urged toward each other under adjustable pressure exerted by a suitable mechanism actuated by weighted levers, springs and the like in well-known manner to seal the tubing passing therethrough. The tubing after passing between the pinch rollers 46—46 is passed between a second pair of positively driven pinch rollers 48—48 spaced some distance, for example 10 to 150 feet, from the rollers 46—46 and are also urged together under a suitable pressure in the same or similar manner as the pinch rollers 46—46 so as to seal the tubing passing therethrough. The sets of pinch rollers are provided with suitable devices of known type to raise the upper roller of either pair to permit the insertion of a hose, nozzle or the like in the open end of the casing to fill and expand that portion of the casing which extends between the pinch rollers 46—46 and 48—48 with a body of fluid such as air or some other gas. By wrapping the open end of the casing about the nozzle and holding it tightly, the operator can impose the desired pressure on the casing to expand the casing to the desired diameter as shown at 50. The operator then lowers the upper roller into contact with the tubing so as to pinch the tubing between the rollers and seal it against leakage of the fluid and withdraws the nozzle from the tubing. The casing is passed while expanded through a suitable drier housing 52 which may be supplied with a suitable heating medium, for example hot air, through a conduit 54. The air may be suitably discharged from the housing 52 by the conduit 56 which returns the air for reheating or exhausts it to the atmosphere.

The predetermined diameter 50 to which the casing is expanded is ascertained by trial and is selected so that the casing, after drying, slitting, rewetting, and being reformed into a tube or tubes will produce in each final tube a circumference slightly smaller than the circumference to which it will be stuffed. The difference between the rewetted circumference and the circumference immediately after stuffing is made as small as possible, having regard for the wall thickness of the casing and the physical characteristics of the material from which it is formed, so as to require a minimum stuffing pressure and, at the same time, cause the elastic forces exerted by the casing during stuffing to be sufficient to hold the product within the casing in a compact, shapely mass which is free from bulges such as would occur if the casing did not exert any pressure on the stuffing material during and subsequent to stuffing. An expansion in the system 45 to a diameter 50 which is from 5 to 40 per cent greater than the diameter after stuffing has been found to be satisfactory.

In view of the fact that the tubing is expanded as it passes between the rollers 46—46 and 48—48, it may be necessary to drive the pinch rollers 46—46 at a greater peripheral speed than the pinch rollers 48—48 are driven to compensate for the loss in length due to the increase in diameter. As the expanded tubing passes through the drier housing 52, the moisture will be evaporated, and as it comes from the drier, it will contain the desired amount of moisture for a so-called "dry" casing, which is usually between 4 and 12 per cent for a cellulosic type of material, depending to some extent on the climatic conditions under which the tubing is to be stored and further processed prior to stuffing.

As the dry tubing leaves the pinch rollers 48—48, it passes to a slitter 58 comprising a rotary cutter 59 working against a shear member 60 formed as a guiding foot about which the tubing is gradually spread open before slitting. The foot 60 is supported upon a bracket 61. The slit tubing is spread to open width by means of guides such as 62 and after spreading to open width, the sheet is passed between a pair of delivery rollers 63. From the rollers 63, the sheet may pass to the slitter 64. The slitter 64 may comprise a lower roller 65 having a rubber cover 66 and an upper rotor 67 comprising one or more rotary knives 68 to divide the sheet into two, three, or more individual widths. From the slitter 64, the individual widths may proceed directly to separate stuffing stations. As shown in the drawing, two such widths are passed to similar stuffing stations S. One of the sheets passes about the rollers 67, 70 and 71 over a coating roll 72 which applies a solvent or adhesive to one edge of the sheet as it proceeds to the tube-forming sleeve 73 which surrounds the stuffing horn 74. The roller 70, which is weighted at 75, serves to store any excess material fed from the slitter 64 whenever a slowdown in the stuffing operation occurs. The transfer roll 72 operates in a vessel 76 containing the solvent or adhesive. Sausage meat or other material to be stuffed is provided in the vessel 77 which may be connected to a source of air pressure by pipe 80 for forcing the stuffing material through the nozzle 74. The edges of the sheet are overlapped by means of the tube-forming sleeve 73 and the belt 78 presses the overlapped edges together and against the stuffing nozzle 74 to form the seal before the tubing reaches the stuffing position at the end 79 of the stuffing horn. The other sheet may pass about guide rolls 81 and 82 to a similar stuffer. The stuffing and tube-forming systems shown may be replaced by any of the systems disclosed in the copending applications of Reichel et al. Serial No. 81,786, filed March 16, 1949, now abandoned; Wright et al. Serial No. 94,164, filed May 19, 1949, now Patent No. 2,653,432, granted September 29, 1953; and Conti Serial No. 139,830, filed January 21, 1950, now Patent No. 2,686,128.

When the sheet resulting from the slitting operation effected at 58 is of the proper width for the particular size of sausage being produced, the slitter knife at 64 may be elevated out of operative position in which event a single stuffer would be supplied with the resulting sheet.

While the drawing shows a continuous operation from the initial formation of tubing to the stuffing of the final reformed tubing or casing, it may be desirable to perform the stuffing at other places than that in which the sheet is formed. In such event, the sheet proceeding from rolls 63, if it is desired to be of full width, is wound up on a suitable shaft or core or, if narrow widths are desired, the sheets proceeding from the slitter 64 are wound either on separate cores or on a common core. The resulting wound sheets can then be shipped or transported to the stuffing station or stations.

The sheet or sheets formed may be printed with any designs or indicia that may be desired either before or after they pass the rolls 63, or the slitting station 64.

As stated hereinabove, the present invention has the advantages of providing a continuous stuffing operation with a casing which requires a low stuffing pressure and which has been prestretched transversely and preferably also longitudinally and thereby pretested to assure freedom from rupturing during stuffing. In addition, the production of the individual sheets by the slitting of a seamless tube results in a saving of material because the tubing is of uniform wall thickness which avoids the necessity to trim off the beaded edges of sheets which are originally extruded as sheets. These beaded or thickened edges are formed apparently as a result of surface tensions of the film-forming material adjacent the edges of the sheet as it leaves the extrusion slit.

The invention may be applied for the production of all varieties of stuffed products. Besides the production of sausages, such as weiners, frankfurters, bologna, etc., the process may be applied to the stuffing of ham butts, boned meat, fowl, cheese, ice cream, and other non-edible products, such as lubricating grease, snuff, calking compounds, and pastes of any type.

It is to be understood that changes and variations may be made without departing from the spirit and scope of the invention as defined in the appended claims. Thus, other systems of transversely prestretching than that shown at 30 may be used and other systems of drying may be used. While the extent of prestretching at 30 is preferably such that when the casing subsequently formed of the sheet will not expand during stuffing, this may be varied somewhat, if desired. Also, it should be noted that when a drying system is used that involves inflation, the diameter 50 during drying may be such that the inflation at this stage is either the same as the inflation at 30 or more than this or even less, such as to the diameter to which the expanded tube may shrink during purification following the prestretching at 30, or to any diameter intermediate these limits.

I claim:

1. A process for the continuous production of stuffed products having tubular casings which have been prestretched in both a circumferential and longitudinal direction comprising the steps of initially extruding a film-forming, non-fibrous, plastic material to form a seamless tube, continuously passing the seamless tube through a path, stretching the tube circumferentially at a portion of the path by inflating it with a fluid, pre-stretching the tube longitudinally by elongating the same at a portion of the path, said circumferential and longitudinal stretching being adapted to render said casing more resistant to bulging and subsequent elongation when stuffed, slitting the tube longitudinally at the end of the path to produce a sheet, continuously passing the sheet directly from said slitting operation to a stuffing station, continuously overlapping and adhering the edges of the sheet to form a casing as it passes to the stuffing station, and continuously forcing a stuffing material into the casing at the stuffing station, said circumferential stretching being such that the tube, after being slit and formed into a casing as it passes to the stuffing station has a circumference slightly smaller than the circumference to which it will be stuffed, thereby permitting the use of a minimum stuffing pressure at said stuffing station.

2. A process as defined in claim 1 in which the plastic material comprises an alkali-soluble, water-insoluble cellulose ether.

References Cited in the file of this patent

UNITED STATES PATENTS

| | | |
|---|---|---|
| 2,142,505 | Gammeter | Jan. 3, 1939 |
| 2,145,941 | Maxfield | Feb. 7, 1939 |
| 2,177,633 | Blackard | Oct. 31, 1939 |
| 2,177,660 | Kimble et al. | Oct. 31, 1939 |
| 2,181,887 | Goodman | Dec. 5, 1939 |
| 2,199,425 | Waring | May 7, 1940 |
| 2,307,817 | Austin | Jan. 12, 1943 |
| 2,337,927 | Reichel et al. | Dec. 28, 1943 |
| 2,401,798 | Reichel | June 1, 1946 |
| 2,616,232 | Meyer | Nov. 4, 1952 |